(No Model.)
A. C. WILSON.
FOUR HORSE EQUALIZER.
No. 399,718. Patented Mar. 19, 1889.
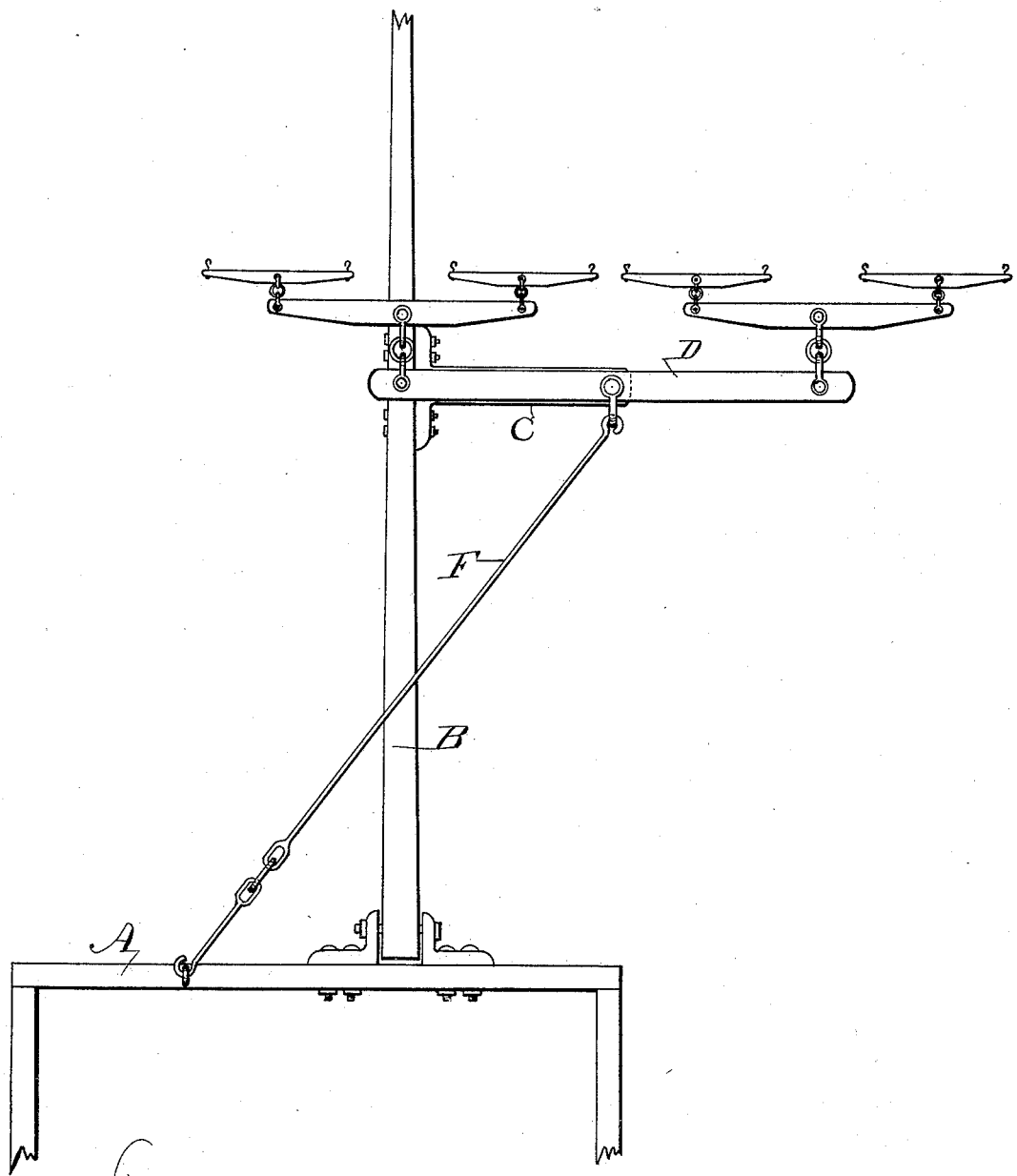

UNITED STATES PATENT OFFICE.

ANDREW C. WILSON, OF VICTOR, IOWA.

FOUR-HORSE EQUALIZER.

SPECIFICATION forming part of Letters Patent No. 399,718, dated March 19, 1889.

Application filed November 5, 1888. Serial No. 290,044. (No model.)

*To all whom it may concern:*

Be it known that I, ANDREW C. WILSON, a citizen of the United States of America, residing at Victor, in the county of Iowa and States of Iowa, have invented an Improved Four-Horse Equalizer, of which the following is a specification.

My object is to connect a straight bar and common doubletrees and singletrees with the pole of a reaper in such a manner that three horses can be hitched on one side of the pole and walk abreast with another horse hitched on the other side of the pole in such a manner that their draft force will be equalized and applied centrally to the reaper as required to avoid side draft.

My invention consists in fixing a branch to the rear portion of a pole to extend horizontally and at right angles and combining an evener and a draft-rod with a pole and branch and the frame of the reaper, as hereinafter set forth, pointed out in my claim, and illustrated in the accompanying drawing, in which is shown a plan view.

A represents the frame of a reaper and binder carriage, and B a pole hinged to the front, at one side of the center, in a common way.

C is a branch rigidly fixed to the side of the pole B by means of bolts, or in any suitable way, to extend laterally and at right angles. This branch is about sixteen inches long and located about four feet from the rear end of the pole.

D is a straight bar and evener, about forty inches long, pivoted to the end of the branch C in such a manner that one of its ends will extend over the pole. It is connected with the branch by means of a common clevis and bolt, and the hole in the branch, through which the pivot is passed, is large enough to prevent the draft of the horses from being applied to the branch when the clevis is connected with the frame of the reaper. The function of the branch is therefore simply to support the evener D, so that the draft of the horses applied thereto can be transferred to the frame at a point on the other side of the pole by means of a rod, F, that is flexibly connected with the clevis and the frame in the manner shown or in any suitable way, so it will extend diagonally across the pole.

Heretofore a bracket has been fixed to a pole to extend laterally, and a long doubletree, carrying two short doubletrees and four singletrees, pivoted to the free end of the bracket, and a rod extended from the same pivot and pivotally connected with the draft-beam of the machine on the same side of the pole. A four-horse evener has also been pivoted to the end of a link and the link pivoted to a pole to extend laterally, and a cable connected with the end of the link and the center of the long doubletree by means of a clevis, and extended diagonally across the pole and over pulleys to be fixed to the frame of the machine; but my manner of connecting a long doubletree with a fixed branch extending laterally from the pole by means of a clevis and connecting the clevis with the frame by means of a jointed rod, so as to prevent the draft from being applied to the pole and fixed branch, but to be transferred to the opposite side of the pole and applied to the frame by means of the clevis and rod, is novel and advantageous. It is obvious that when draft is applied to the end of a fixed branch or bracket that extends laterally from a pole such draft will be communicated to the pole and through the pole to the machine at a point where it is not desired; and when draft is applied to an evener that is supported on a link that is pivoted to a pole and connected with the frame by means of a cable there will be a lateral pressure against the pole through the pivoted link. These defects in prior devices are obviated by my manner of combining a four-horse evener with a pole and machine so that no draft force of the horses will be communicated to the pole.

I claim as my invention—

The four-horse draft-equalizer composed of a pole, B, hinged to a reaper-frame, A, a branch, C, fixed to the pole and provided with a large perforation or slot in its free end, an evener, D, pivoted to the end of said branch by means of a clevis, doubletrees and singletrees connected with the ends of the evener, and a rod, F, connected with the clevis at the end of the branch C and with the frame A, substantially as shown and described, to operate in the manner set forth.

ANDREW C. WILSON.

Witnesses:
H. HOWARD,
ROBERT HUGHES.